United States Patent [19]

Jung

[11] Patent Number: 5,731,851
[45] Date of Patent: Mar. 24, 1998

[54] METHOD FOR DETERMINING FEATURE POINTS BASED ON HIERARCHICAL BLOCK SEARCHING TECHNIQUE

[75] Inventor: Hae-Mook Jung, Seoul, Rep. of Korea

[73] Assignee: Daewoo Electronics, Co., Ltd., Seoul, Rep. of Korea

[21] Appl. No.: 616,019

[22] Filed: Mar. 14, 1996

[30] Foreign Application Priority Data

Mar. 15, 1995 [KR] Rep. of Korea ............... 95-5308

[51] Int. Cl.⁶ ..................................... H04N 7/18
[52] U.S. Cl. ..................... 348/699; 348/413; 348/415; 348/416
[58] Field of Search ................... 348/416, 415, 348/412, 699, 700, 413

[56] References Cited

U.S. PATENT DOCUMENTS

| | | | |
|---|---|---|---|
| 5,111,511 | 5/1992 | Ishii et al. | 382/1 |
| 5,453,800 | 9/1995 | Kondo et al. | 348/699 |
| 5,546,129 | 8/1996 | Lee | 348/699 |
| 5,581,308 | 12/1996 | Lee | 348/699 |
| 5,592,228 | 1/1997 | Dachiku et al. | 348/416 |

*Primary Examiner*—Tommy P. Chin
*Assistant Examiner*—Mand S. Rao
*Attorney, Agent, or Firm*—Pennie & Edmonds LLP

[57] ABSTRACT

A novel method for determining feature points comprises the steps of detecting edge points from the video frame; selecting, as a processing block, a block having a maximum number of edge points within said each search region; dividing the processing block into a number of candidate blocks; and selecting a candidate block having a maximum number of edge points within the processing block to determine the center pixel of the selected candidate block as one of the feature points.

8 Claims, 4 Drawing Sheets

METHOD FOR DETERMINING FEATURE POINTS BASED ON HIERARCHICAL BLOCK SEARCHING TECHNIQUE

FIELD OF THE INVENTION

The present invention relates to a method for determining feature points; and, more particularly, to a method which is capable of effectively coding a video signal by determining feature points based on an edge of an object.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of digital data is generated for transmission, especially in the case of a high definition television system. Since, however, the available frequency bandwidth of a conventional transmission channel is limited, in order to transmit the substantial amount of the digital data through the limited channel bandwidth, it is inevitable to compress or reduce the volume of the transmission digital data. Among various video compression techniques, the so-called hybrid coding technique, which combines temporal and spatial compression techniques together with a statistical coding technique, is known to be most effective.

Most hybrid coding techniques employ a motion compensated DPCM (differential pulse code modulation), two-dimensional DCT (discrete cosine transform), quantization of DCT coefficients, and VLC (variable length coding). The motion compensated DPCM is a process of estimating the movement of an object between a current frame and a previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12 (December 1985); and in Ninomiya and Ohtsuka, "A Motion-Compensated Interframe Coding Scheme for Television Pictures", *IEEE Transactions on Communications*, COM-30, No. 1 (January 1982).

Specifically, in the motion compensated DPCM, current frame data is predicted from the corresponding previous frame data based on an estimation of the motion of an object between the current and the previous frames. Such an estimated motion may be described in terms of two dimensional motion vectors representing displacements between corresponding pixels in the previous and the current frames.

There have been two basic approaches to estimate displacements of pixels of an object: one is a block-by-block estimation and the other is a pixel-by-pixel approach.

In the block-by-block motion estimation, a block in a current frame is compared with blocks in its previous frame until a best match is determined. From this, an interframe displacement vector (representing how much the block of pixels has moved between frames) for the whole block can be estimated for the current frame being transmitted. However, in the block-by-block motion estimation, a poor estimation may result if all pixels in a block do not move in the same way, to thereby decrease the overall picture quality.

Using a pixel-by-pixel approach, on the other hand, a displacement is determined for each and every pixel. This approach allows a more exact estimation of the pixel value and has the ability to easily handle scale changes (e.g., zooming, movement perpendicular to the image plane). However, in the pixel-by-pixel approach, since a motion vector is determined for each and every pixel, it is virtually impossible to transmit all of the motion vectors to a receiver.

One of the techniques introduced to ameliorate the problem of dealing with the surplus or superfluous transmission data resulting from the pixel-by-pixel approach is a feature point-based motion estimation technique. In the feature point-based motion estimation technique, a set of selected pixels, i.e., feature points, are determined at an encoder in a transmitting end and then reverse processed at a decoder in a receiving end and motion vectors for the feature points are transmitted to the receiver without their position data, wherein the feature points are defined as pixels of a previous frame or a current frame capable of representing motions of objects in a video signal so that motion vectors for all the pixels of the current frame can be recovered or approximated from those of the feature points in the receiver. In an encoder which adopts the motion estimation based on feature points, disclosed in a commonly owned copending application, U.S. Ser. No. 08/367,520, entitled "Method and Apparatus for Encoding a Video Signal Using Pixel-by-Pixel Motion Estimation", a number of feature points are first selected for all of the pixels contained in the previous frame. Then, motion vectors for the selected feature points are determined, wherein each of the motion vectors represents a spatial displacement between one feature point in the previous frame and a corresponding matching point, i.e., a most similar pixel, in the current frame. Specifically, the matching point for each of the feature points is searched in a search region within the current frame, wherein the search region is defined as a region of a predetermined area which encompasses the corresponding feature point. In the feature point-based motion estimation technique, since the current frame is predicted from the previous frame based on those motion vectors for a set of feature points, it is important to select the feature points capable of correctly representing the movement of the object.

Typically, in an encoder and a decoder which adopt the motion estimation based on feature points, a number of feature points are selected by using a grid technique.

In the grid technique employing various types of grid, e.g., a rectangular or hexagonal grid, the nodes, i.e., intersection points of grid lines or grid points of the grid, are determined as the feature points. However, the grid points do not always correctly represent the movement of the object, resulting in a poor motion estimation of the object.

SUMMARY OF THE INVENTION

It is, therefore, a primary object of the present invention to provide an improved feature point determining method which is capable of effectively coding a video signal by determining feature points based on an edge of an object.

In accordance with the invention, there is provided a method, for use in a video signal processor which adopts a feature-point based motion compensation technique, for determining feature points, said feature points being pixels capable of representing motions of objects in a video frame, which comprises the steps of:

generating a grid on the video frame to provide a plurality of grid points, the grid points being pixel positions located at nodes of the grid;

generating a plurality of search regions, each search region having one of the grid points at a center thereof and including a multiplicity of blocks;

detecting edge points from the video frame;

selecting, as a processing block, a block having a maximum number of edge points within said each search region;

dividing the processing block into a number of candidate blocks; and selecting a candidate block having a maximum number of edge points within the processing block to determine the center pixel of the selected candidate block as one of the feature points.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
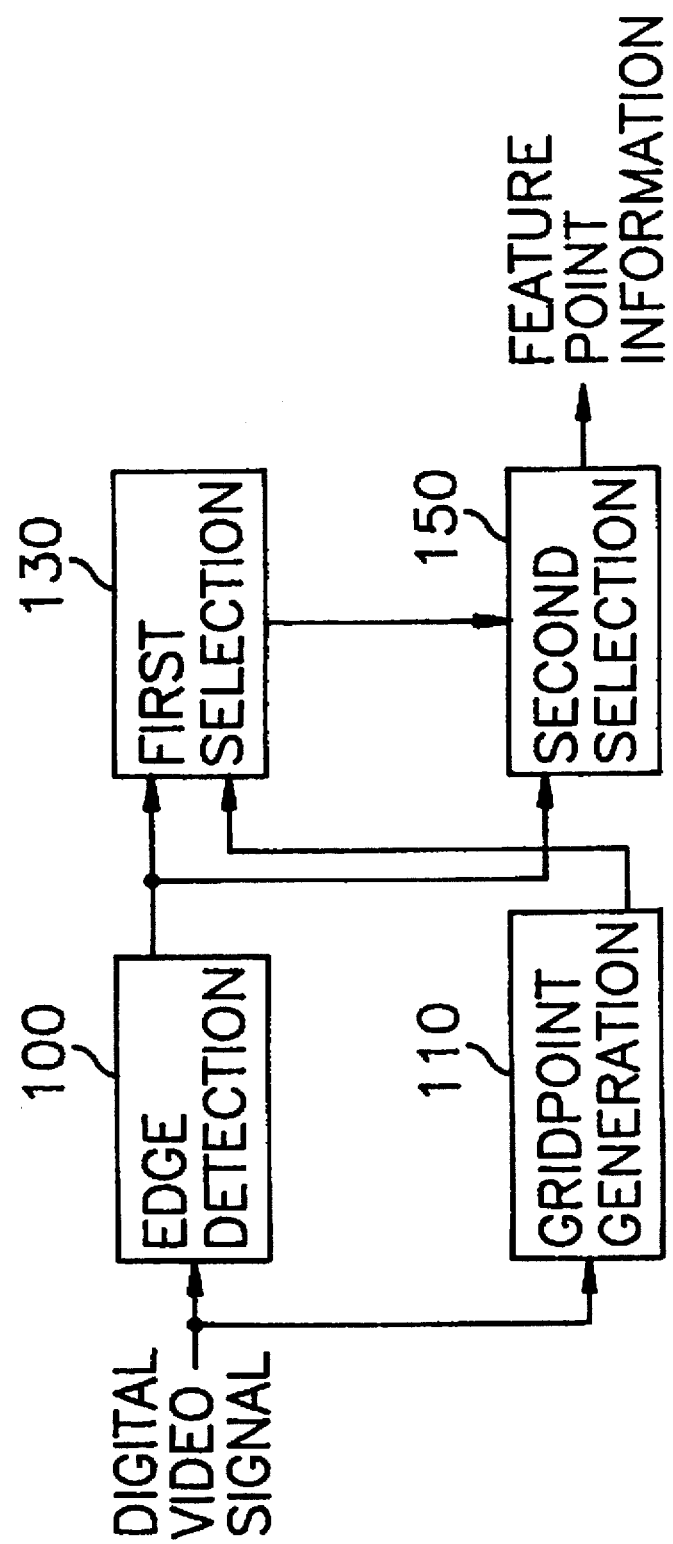
FIG. 1 depicts a block diagram of the inventive apparatus for determining feature points.

Referring to FIG. 1, there is illustrated an apparatus, for use in an encoder and a decoder which adopt a feature point based motion compensation technique, for determining feature points in accordance with the present invention, wherein the feature points are defined as pixels capable of representing motions of objects in a video signal.

A digital video signal of a video frame, e.g., a previous or a current frame, is fed to an edge detection block 100. The edge detection block 100 detects edge points in the video frame by using a conventional gradient operator, e.g., a sobel operator. For instance, directional gradients, e.g., horizontal and vertical gradients $G_x(x,y)$ and $G_y(x,y)$ at a pixel location (x,y), are calculated by using the horizontal and the vertical sobel operators, and a gradient magnitude g(x,y) at the pixel location (x,y) may be obtained as:

$$g(x,y)=|G_x(x,y)|+|G_y(x,y)|$$

And then the edge points in the video frame are detected by comparing the gradient magnitude g(x,y) for each pixel in the video frame with a predetermined threshold value Te. That is, the pixel location (x,y) is an edge point if g(x,y) exceeds Te.

Subsequently, an edge signal eg(x,y) denoting the locations of the edge points is provided to a first and a second selection blocks 130 and 150.

Figure 2:
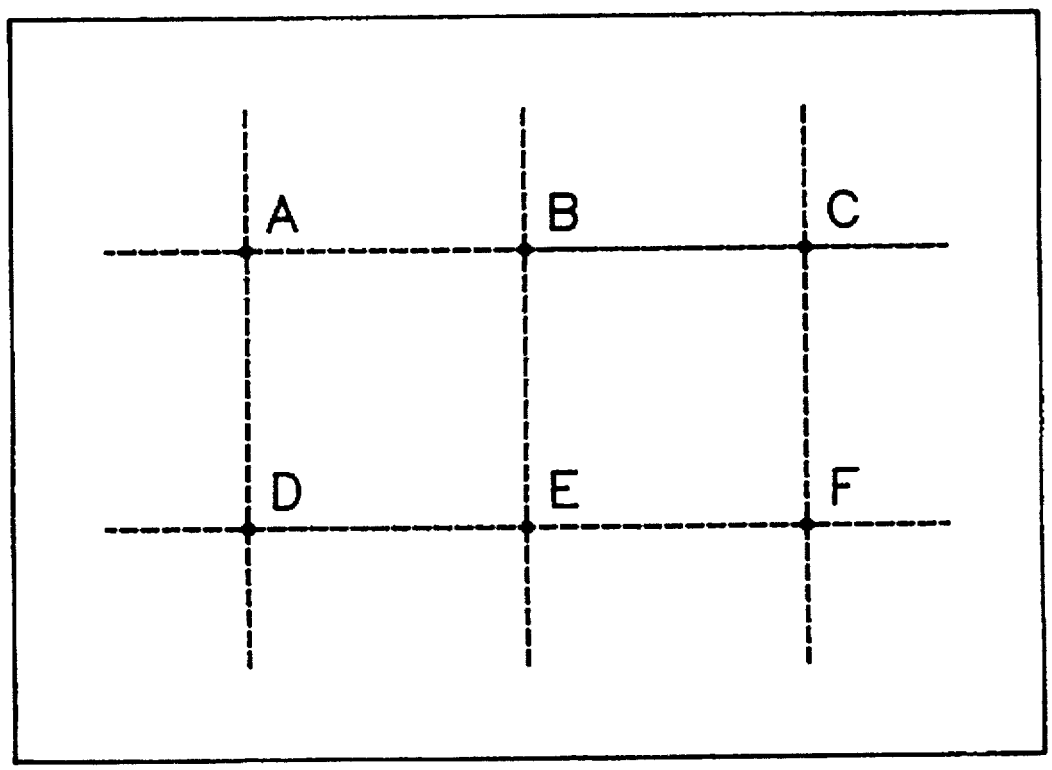
FIG. 2 offers exemplary grid points generated by employing a rectangular grid.

In the meantime, a grid point generation block 110 generates a grid and provides a plurality of grid points to the first selection block 130, wherein the grid points are pixel positions, e.g., A to F, located at nodes of the grid, i.e., intersection points of rectangular grid lines depicted in dotted lines in FIG. 2.

Figure 3:
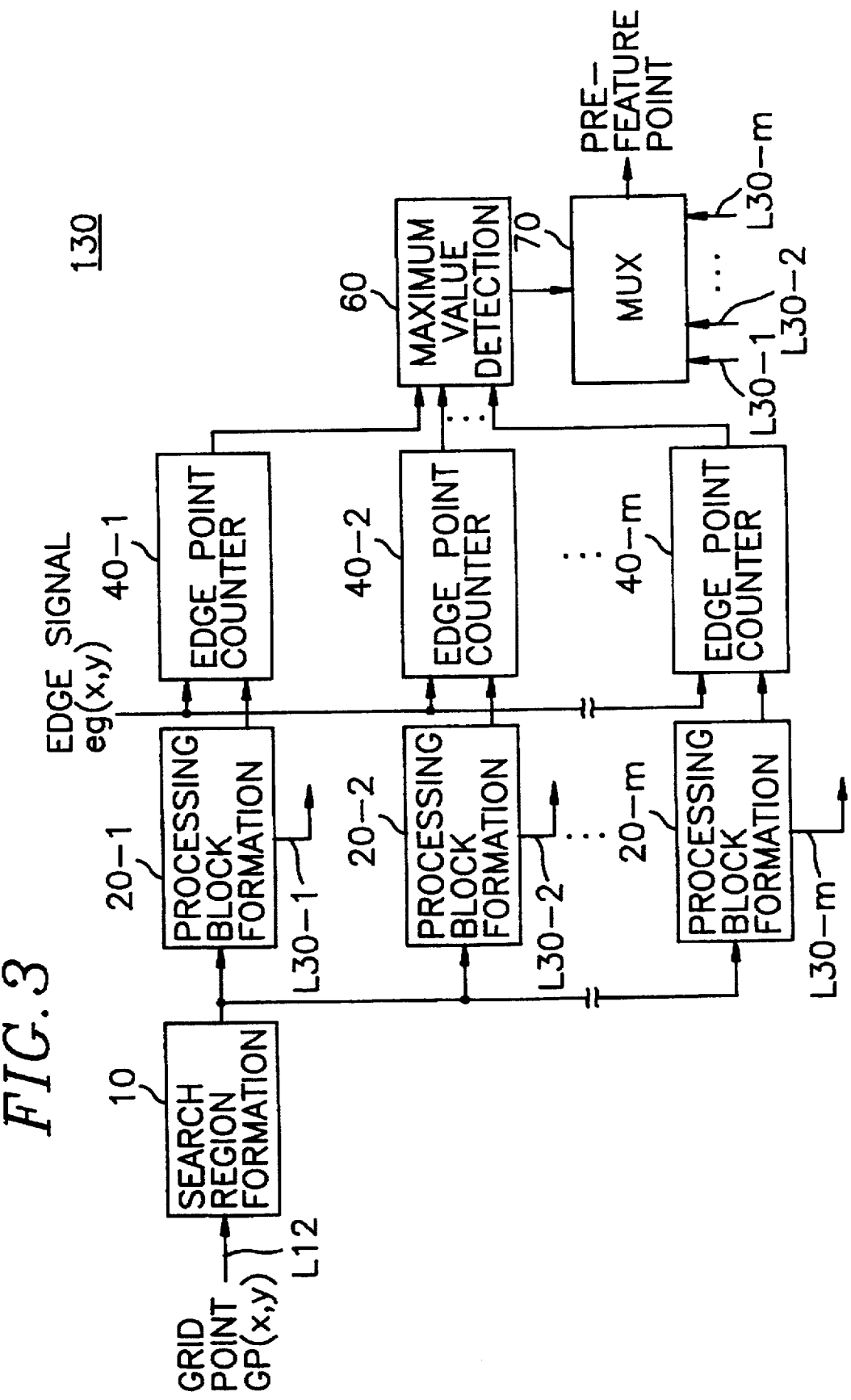
FIG. 3 shows a detailed block diagram of the first selection block of FIG. 1.

Referring to FIG. 3, there are illustrated the details of the first selection block 130 shown in FIG. 1. As shown in FIG. 3, the grid point GP(x,y) on the line L12 from the grid point generation block 110 is inputted to a search region formation block 10.

In response to the grid point GP(x,y), the search region formation block 10 formats a search region of (N+1)×(N+1), e.g., 11×11, pixels (N being an even integer) having the grid point GP(x,y) at the center thereof wherein the search region includes m number of processing blocks of (L+1)×(L+1), e.g., 5×5, pixels (L being an even integer smaller than N). Subsequently, the search region formation block 10 provides search region address data representing the location of a search region to processing block formation sections 20-1 to 20-m.

Each of the processing block formation blocks 20-1 to 20-m provides a processing block address representing the location of each processing block in the search region to each of edge point counters 40-1 to 40-m; and a center point representing the position of a center pixel in each of the processing blocks to a multiplexer 70 through lines L30-1 to L30-m.

In the meantime, the edge signal eg(x,y) from the edge detection block 100 is provided to the edge point counters 40-1 to 40-m.

In response to the processing block address fed from each of the processing block formation sections 20-1 to 20-m, each of the edge point counters 40-1 to 40-m counts the number of edge points included in each of the processing blocks to generate an edge point count value.

All the edge point count values from the edge point counters 40-1 to 40-m are supplied to a maximum value detector 60, wherein all the edge point count values are compared with each other and a maximum edge point count value is selected to provide a selection signal, which indicates the processing block having the maximum number of edge points, to the multiplexer (MUX) 70. If more than one processing block have the same maximum number of the edge points, then the selection signal indicates the processing block nearest to the grid point.

In response to the selection signal, the MUX 70 chooses the center point in the processing block, which has the maximum number of edge points, to provide it as a pre-feature point for the search region.

The pre-feature point obtained in the first selection block 130 as explained above is applied to the second selection block 150.

The operation of the second selection block 150 is substantially the same with that of the first selection block 130 except that it defines its search region as the processing block having the pre-feature point at the center thereof instead of the search region having the input grid point at the center thereof. That is, in response to the pre-feature point, the second selection block 150 divides the processing block having the pre-feature point at the center thereof into a plurality of candidate blocks. And the second selection block 150 selects a candidate block having a maximum number of edge points in the processing block and determines a center pixel of the selected candidate block as a feature point for the search region having the grid point at the center thereof, thereby providing feature point information representing the position of the feature point. If more than one candidate block has the same maximum number of edge points, then the center pixel of the candidate block nearest to the center point is selected as the feature point. And if no edge points are found in a search region, the grid point itself included in the search region is selected as a feature point.

Figure 4:
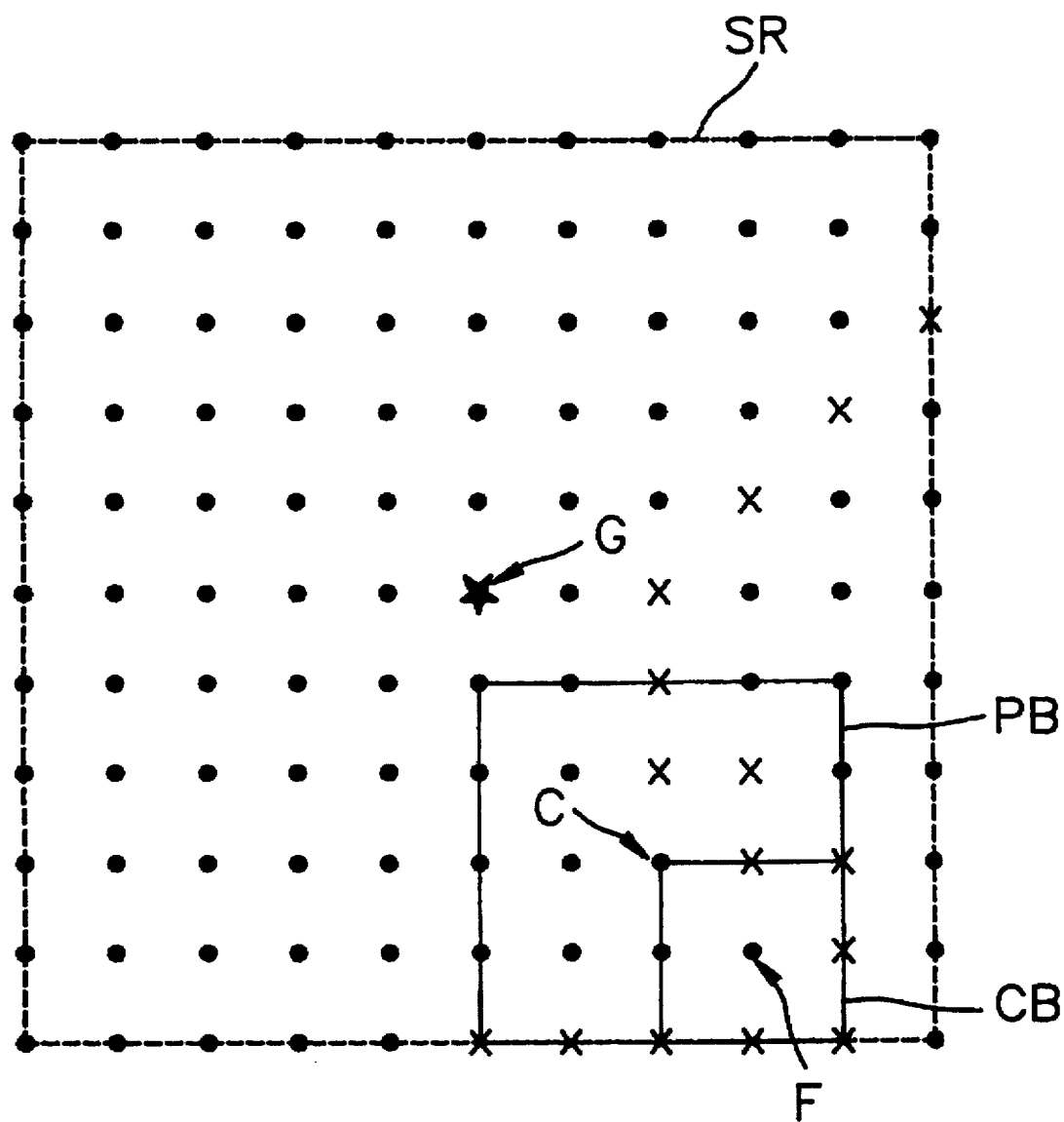
FIG. 4 illustrates the feature point selection operation in accordance with the present invention.

In FIG. 4, the feature points selected as above are shown exemplarily, wherein the dots represent pixels, and the x marked points denote the edge points, block SR indicates a search block having a star marked grid point G, sub-block PB illustrates a processing block having a center point C, and lesser sub-block CB exemplifies a candidate block having a feature point F.

While the present invention has been described with respect to the particular embodiments, it will be apparent to those skilled in the art that various changes and modifications may be made without departing from the spirit and scope of the invention as defined in the following claim.

What is claimed is:

1. A method, for use in a video signal processor which adopts a feature-point based motion compensation technique, for determining feature points, said feature points being pixels capable of representing motions of objects in a video frame, which comprises the steps of:

generating a grid on the video frame to provide a plurality of grid points, the grid points being pixel positions located at nodes of the grid;

generating a plurality of search regions of $(N+1) \times (N+1)$ pixels, wherein N is an even integer, each search region having one of the grid points at a center thereof;

generating, for each search region, M blocks of $(L+1) \times (L+1)$ pixels, wherein M is an integer, and L is an even integer smaller than N;

detecting edge points from the video frame;

selecting, as a processing block, a block having a maximum number of edge points within each search region;

dividing the processing block into a number of sub-blocks smaller than $(L+1) \times (L+1)$ pixels; and selecting a sub-block having a maximum number of edge points within the processing block to determine the center pixel of the selected sub-block as one of the feature points.

2. The method according to claim 1, further comprising the step of selecting a grid point as one of the feature points when a search region including said grid point has no edge point therein.

3. The method according to claim 1, wherein the center pixel of the sub-block nearest to the center pixel of the processing block is chosen as the feature point when more than one candidate block has the same maximum number of edge points.

4. An apparatus, for use in a video signal processor which adopts a feature-point based motion compensation technique, for determining feature points, said feature points being pixels capable of representing motions of objects in a video frame, said apparatus comprising:

means for generating a grid on the video frame to provide a plurality of grid points, the grid points being pixel positions located at nodes of the grid;

means for detecting edge points from the video frame;

means for generating a plurality of search regions of $(N+1) \times (N+1)$ pixels, each search region having one of the grid points at a center thereof, wherein N is an even integer;

means for generating, for each search region, M blocks of $(L+1) \times (L+1)$ pixels, wherein M is an integer, and L is an even integer smaller than N;

first selection means for selecting, as a processing block, a block having a maximum number of edge points within each search region;

means for dividing the processing block into a number of sub-blocks; and second selection means for selecting a sub-block having a maximum number of edge points within the selected processing block to determine the center pixel of the selected sub-block as one of the feature points.

5. The apparatus according to claim 4, wherein the first selection means includes:

M number of edge point counters, each for counting the number of edge points included in a corresponding processing block to generate an edge count value; and maximum value detection means, receiving all of the edge point count values, for selecting a processing block having a maximum number of edge points.

6. The apparatus according to claim 5, wherein the second selection means includes:

M number of edge point counters, each for counting the number of edge points included in a corresponding sub-block to generate an edge count value; and maximum value detection means, receiving all of the edge point count values, for selecting a sub-block having a maximum number of edge points.

7. The method of claim 1, further comprising the step of selecting a grid point as one of the feature points when a search region including said grid point has no edge points therein.

8. The method of claim 1, wherein the center pixel of the sub-block nearest to the center pixel of the processing block is chosen as the feature point, if more than one candidate block has the same maximum number of edge points.

* * * * *